3,147,300
GASTROPOD COMBATING SALICYLANILIDES
Ernst Schraufstätter and Rudolf Gönnert, both of Wuppertal-Elberfeld, Germany, assignors to Farbenfabriken Bayer Aktiengesellschaft, Leverkusen, Germany, a corporation of Germany
No Drawing. Filed Oct. 21, 1959, Ser. No. 847,680
Claims priority, application Germany Sept. 26, 1955
9 Claims. (Cl. 260—479)

The present invention concerns derivatives of 2-hydroxy-benzoic-anilides and, more particularly, derivatives of 2-hydroxy-benzoic-anilides which are very suitable as agents for combating gastropods. The instant application is a continuation-in-part of application Serial No. 612,104, filed September 26, 1956, now abandoned. Reference is also made to Patent 3,079,297, issued on application 32,602, filed May 31, 1960, which application was a division of the instant application.

It is well known that a considerable amount of agricultural and horticultural damage is traceable to gastropods. In addition, snails and slugs of this order serve as hosts to many common parasites, as for example the trematodes. The transmitting host or snail releases the final free swimming larval stage of a trematode (cercaria), consisting of a body and tail, into the water where the same encyst on aquatic vegetation, in the skin of fish or in the bodies of crabs and are the infesting stage of trematodes for man and animals. The parasites enter the body via the alimentary tract by ingestion of the uncooked or insufficiently cooked fish, crustaceans and vegetation, through drinking infested water or through the skin of persons or animals bathing or wading in the infested water.

Thus, it is most important from the public health standpoint not only to treat the disease entity once it has occurred, but to wipe out the gastropod and thus the source of the disease. It can be appreciated that in countries where epidemics of these diseases occur a satisfactory method of combating the gastropod invertebrate host, i.e. the snail, can be of great and special importance.

The most commonly known agent used in destroying the gastropod is copper sulfate. However, the same is not specific and additionally is not statistically effective. The use of 5,5'-dibromo-salicil and pentachlorophenol has been suggested for combating gastropods. However, the same do not exhibit specificity and additionally must be used in very high concentrations.

It is an object of the present invention to provide new and useful agents for combating gastropods.

It is a further object of the invention to provide new and useful agents for combating gastropods which are especially effective with respect to snails and slugs, which invertebrate animals cause considerable agricultural and horticultural damage and which are the intermediate hosts of the trematodes and flukes, which are parasitic in man and animals.

In accordance with the invention, it has now been found that compounds characterized by the following formula are very active gastropodicidal agents:

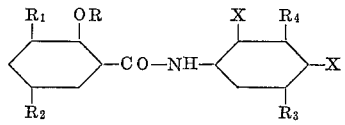

wherein R represents either hydrogen or a lower aliphatic acyl radical, either X is a nitro group and the other X represents hydrogen, methyl, chlorine or bromine, $R_1$ represents either hydrogen or methyl, $R_2$ represents chlorine or bromine, $R_3$ and $R_4$ represent hydrogen, chlorine or bromine, and wherein only one of $R_3$ or $R_4$ can be chlorine or bromine, and wherein at most 3 halogens, i.e. chlorine or bromine, are present.

The new gastropodicidal derivatives of 2-hydroxy-benzoic-anilide, to which the invention relates, are prepared in exactly the same way as the preparation of salicylanilide, i.e. by reacting the corresponding substituted salicylic acid or its derivatives with aniline or its derivatves, as described for example in Annalen der Chemie 210, 341–342; Berichte der Deutschen Chemischen Gesellschaft 22, 2907; Berichte der Deutschen Chemischen Gesellschaft 6, 336; Journal fuer praktische Chemie [2] 16, 442.

The following derivatives of 2-hydroxy-benzoic-anilides are examples of the new and useful compounds of the invention. They have very good gastropodicidal properties and are suitable, therefore, either as such or mixed with other substances for combating gastropods:

| | Melting point, ° C. |
|---|---|
| 5,2',5'-trichloro-4'-nitro-salicylic-anilide | 218 |
| 5,2'-dichloro-4'-nitro-salicylic-anilide | 233 |
| 5,3',5'-trichloro-2'-nitro-salicylic-anilide | 190 |
| 5,2',5'-trichloro-3-methyl-4'-nitro-salicylic-anilide | 194 |
| 5,5'-dichloro-2'-methyl-4'-nitro-salicylic-anilide | 235 |
| 5,4'-dichloro-2'-nitro-salicylic-anilide | 175 |
| 5,2',5'-trichloro-4'-nitro-2-acetoxy-benzanilide | 169 |
| 5,2',5' - trichloro - 3 - methyl-4'-nitro-2-acetoxy-benzanilide | 165 |
| 5-chloro-4'-nitro-salicylanilide | 260 |
| 5,3'-dichloro-4'-nitrosalicylanilide | 241 |
| 5-bromo-2',5'-dichloro-4'-nitrosalicylanilide | 234 |

The novel 2-hydroxy-benzoic-anilide is the essential active part or basis of the agent used to combat the gastropods. The agent may comprise a single compound or a mixture of compounds selected from the stated class. In all cases, it is assumed that the selected active ingredient or ingredients are present in an effective amount.

It will be understood that in most cases the composition also actually includes a suitable carrier in uniform admixture with the active ingredients, e.g. appropriately distributing the ingredients and facilitating application of the active agent to the surface or other locality of use, as for example for such spreading, penetrating or other special access as may be required of the active ingredients for the anti-gastropodal effect. Thus, the compounds are applied usually in combination with solid carriers, such as talc, chalk, bentonite, clay and comprise for example a dusting powder, or the compounds may be applied in combination with liquid carriers, such as water, aliphatic alcohols, especially lower aliphatic alcohols such as methanol etc., ketones, especially lower aliphatic ketones such as acetone, methylethyl-ketone etc., acetonitrile or other inert organic solvents. If applied with or in water, salts of the compounds in their aqueous solutions may be used. Examples of salts which may be used in such solutions are the sodium, potassium or ammonium (i.e. alkali group) salts. However, the free 2-hydroxy compounds or their acyl derivatives may also be used in aqueous emulsions with any inert emulsifier, such as soaps, higher alkyl sulfonates, fatty acid esters, polyglycol ethers or esters and the like. Generally, dilutions or solutions in a concentration of $10^{-1}$ to $10^{-7}$ by weight are used, but also higher or lower concentrations may sometimes be convenient.

The agents may also conveniently be employed admixed with other pesticides, insecticides, fungicides, weed killers, fertilizers, etc. The compositions are not merely specific against certain distinct gastropods, but all snails and slugs, and generally mollusci, are destroyed effectively thereby. By way of example, there are mentioned *Australorbis quadelupensis*, Biophalaria species, Lymnaea species and Galba species.

The following examples illustrate the invention without limiting it in any way. Where not otherwise stated, parts are given as parts by weight, and the temperatures are in degrees centigrade.

Example 1

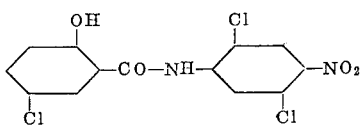

17.2 grams of 5-chloro-salicyclic acid and 20.8 grams of 2,5-dichloro-4-nitro-aniline are dissolved in 250 milliliters of xylene. While boiling, there are introduced slowly 5 grams of PCl₃. Heating is continued for 3 further hours. The mixture then is allowed to cool down and the crystals which separate are filtered off with suction. The crude 5,2′,5′-trichloro-4′-nitro-salicyclic-anilide may be recrystallized from ethanol, melting at 218° C.

Example 2

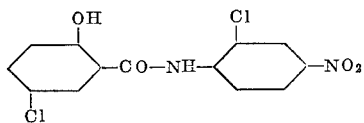

By the same way as described in Example 1, but using equimolecular amounts of 5-chloro-salicyclic acid and 2-chloro-4-nitro-aniline, there is obtained the 5,2′-dichloro-4′-nitro-salicyclic-anilide, melting at 233° C.

Example 3

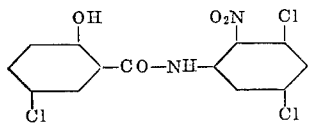

By the same way as described in Example 1, but using equimolecular amounts of 5-chloro-salicyclic acid and 2-nitro-3,5-dichloro-aniline, there is obtained the 5,3′,5′-trichloro-2′-nitro-salicyclic-anilide, melting at 190° C.

Example 4

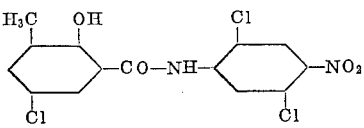

By the same way as described in Example 1, but using equimolecular amounts of 5-chloro-3-methyl-salicyclic acid and 4-nitro-2,5-dichloro-aniline, there is obtained the 5,2′,5′-trichloro-3-methyl-4′-nitro-salicyclic-anilide, melting at 194° C.

Example 5

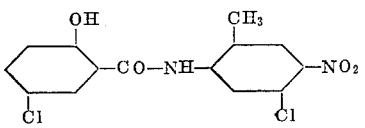

By the same way as described in Example 1, but using equimolecular amounts of 5-chloro-salicyclic acid and 5-nitro-4-chloro-o-toluidine, there is obtained the 5,5′-dichloro-2′-methyl-4′-nitro-salicyclic-anilide, melting at 235° C.

Example 6

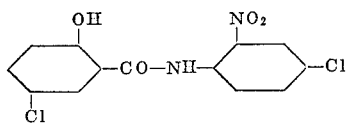

By the same way as described in Example 1, but using equimolecular amounts of 5-chloro-salicyclic acid and 4-chloro-2-nitro-aniline, there is obtained the 5,4′-dichloro-2′-nitro-salicyclic-anilide, melting at 175° C.

Example 7

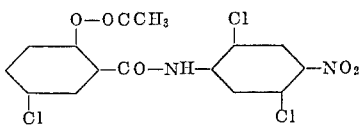

10 grams of 5,2′,5′-trichloro-4′-nitro-salicyclic-anilide are dissolved in 30 milliliters of acetic acid anhydride and heated for 1 hour to the boiling point of acetic acid anhydride under reflux. The reaction mixture is allowed to cool down. The crystals are separated by filtration with suction and washed with a small amount of acetic acid. The 5,2′,5′-trichloro-4′-nitro-2-acetoxybenzanilide obtained is almost pure and melts at 169° C.

Example 8

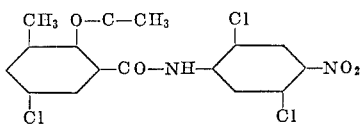

By the same way as described in Example 7, but using the equimolecular amount of 5,2′,5′-trichloro-3-methyl-4′-nitro-salicyclic-anilide, there is obtained the 5,2′,5′-trichloro-3-methyl-4′-nitro-2-acetoxy-benzanilide, melting at 165° C.

The following are a number of specific examples of preparations which are of special value in practical application under various circumstances, as indicated. It will be understood, nevertheless, that these are simply set forth by way of example and that a variety of other combinations may be prepared, including various different combinations of the active ingredients and likewise a variety of carrier and other supplemental materials. In all cases, and indeed elsewhere in this specification, reference to parts or percentages are intended to means values by weight, unless otherwise indicated.

Example 9

10 snails (*Australorbis quadelupensis*) are placed in containers and then treated with pentachlorophenol (I), 5,5′-dibromosalicyl (II) and 5,2′,5′-trichloro-4′-nitro-salicylanilide (III) and 5,2′-dichloro-4′-nitrosalicylanilide (IV), 5,5′-dichloro-2′-methyl-4′-nitrosalicylanilide (V) and 5,4′-dichloro-2′-nitrosalicylanilide (VI). In the following table there are given the concentrations effective in producing a 100% death rate of the snails after 24 hours. (The compounds each are used in aqueous solutions or emulsions.)

| Compound | I | II | III | IV | V | VI |
| --- | --- | --- | --- | --- | --- | --- |
| Concentration | 10⁻⁵ | 10⁻⁵ | 10⁻⁶·⁵ | 10⁻⁶·⁵ | 10⁻⁶·⁵ | 10⁻⁶·⁵ |

Example 10

Effective compositions of two useful active ingredients are given in the following two tables, using (*a*) a solid and (*b*) a liquid composition of active ingredient and a carrier:

(*a*) 50 g. of 5,2′,5′-trichloro-4′-nitro-saliciylanilide, finely divided to particles less than 5 μ, and 50 g. of talc. These compounds are well mixed and may be dusted as such or extended with further carriers.

(*b*) 15 g. 5,2′,5′-trichloro-4′-nitro-salicylanilide, 80 g. glycol-monobutyl-ether and 5 g. polyglycolphenyl-ether (C₈–C₁₀ glycol chain) (Commercial emulsifier). This liquid preparation may be diluted with water and a stable emulsion suitable as an effective molluscicide composition obtained therefrom.

We claim:
1. A 2-hydroxy-benzoic anilide derivative having the formula

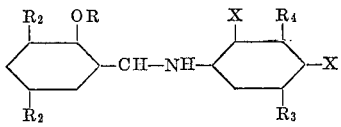

wherein R represents a member selected from the group consisting of hydrogen and lower alkanoyl radicals having from 1 to 4 carbon atoms, X represents a member selected from the group consisting of hydrogen, methyl, nitro chlorine and bromine at least one of X being a nitro group, there being at most one nitro group present, $R_1$ is a member selected from the group consisting of hydrogen and methyl, $R_2$ represents a member selected from the group consisting of chlorine and bromine, $R_3$ and $R_4$ each represent a member selected from the group consisting of hydrogen, chlorine and bromine, but only one of $R_3$ and $R_4$ being a member selected from the group consisting of chlorine and bromine, and wherein at most 3 substituents which are members selected from the group consisting of chlorine and bromine are present.

2. 5,2′,5′-trichloro-4′-nitro-salicylic-anilide, melting at 218° C.

3. 5,2′-dichloro-4′-nitrosalicylic-anilide, melting at 233° C.

4. 5,3′,-5′-trichloro-2′-nitro-salicylic-anilide, melting at 190° C.

5. 5,2′,5′-trichloro-3-methyl-4′-nitro-salicylic-anilide, melting at 194° C.

6. 5,5′-dichloro-2′-methyl-4′-nitro-salicylic-anilide, melting at 235° C.

7. 5,4′-dichloro-2′-nitro-salicylic-anilide, melting at 175° C.

8. 5,2′,5′-trichloro-4′-nitro-2-acetoxy-benzanilide, melting at 169° C.

9. 5,2′,5′-trichloro-3-methyl-4′-nitro-2-acetoxy-benzanilide, melting at 165° C.

References Cited in the file of this patent
UNITED STATES PATENTS

| | | |
|---|---|---|
| 2,703,301 | Shumard | Mar. 1, 1955 |
| 2,703,332 | Bindler et al. | Mar. 1, 1955 |
| 2,731,386 | Reiner | Jan. 17, 1956 |
| 2,764,614 | Meyer | Sept. 25, 1956 |
| 2,861,916 | Model et al. | Nov. 25, 1958 |

FOREIGN PATENTS

| | | |
|---|---|---|
| 429,270 | Great Britain | May 22, 1935 |

OTHER REFERENCES
Germany, F 11289 IV a/451, July 26, 1956.

UNITED STATES PATENT OFFICE
CERTIFICATE OF CORRECTION

Patent No. 3,147,300                      September 1, 1964

Ernst Schraufstätter et al.

It is hereby certified that error appears in the above numbered patent requiring correction and that the said Letters Patent should read as corrected below.

Column 2, line 7, for "derivatves" read -- derivatives --; column 3, lines 10, 16, 27, 29, 38, 40, 50, 52, 61, 63, 73 and 75, and column 4, lines 8, and 25, for "salicyclic", each occurrence, read -- salicylic --; column 4, line 38, for "means" read -- mean --; line 65, for "saliciylanilide" read -- salicylanilide --; column 5, lines 5 to 9, the formula should appear as shown below instead of as in the patent:

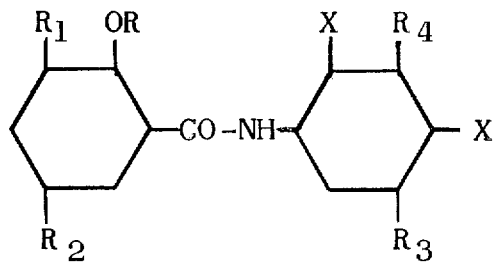

Signed and sealed this 9th day of February 1965.

(SEAL)
Attest:

ERNEST W. SWIDER                      EDWARD J. BRENNER
Attesting Officer                     Commissioner of Patents